3,335,693
SIGNAL MIRRORS
Malcolm G. Murray, Jr., Box 410, Seroe Colorado,
Aruba, Netherlands Antilles
Filed Aug. 31, 1965, Ser. No. 483,922
7 Claims. (Cl. 116—20)

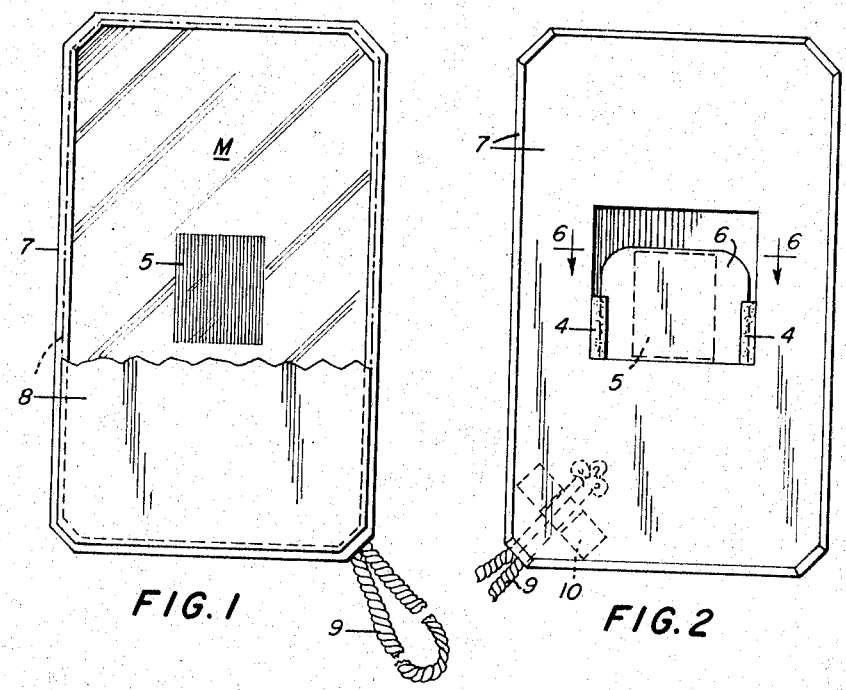
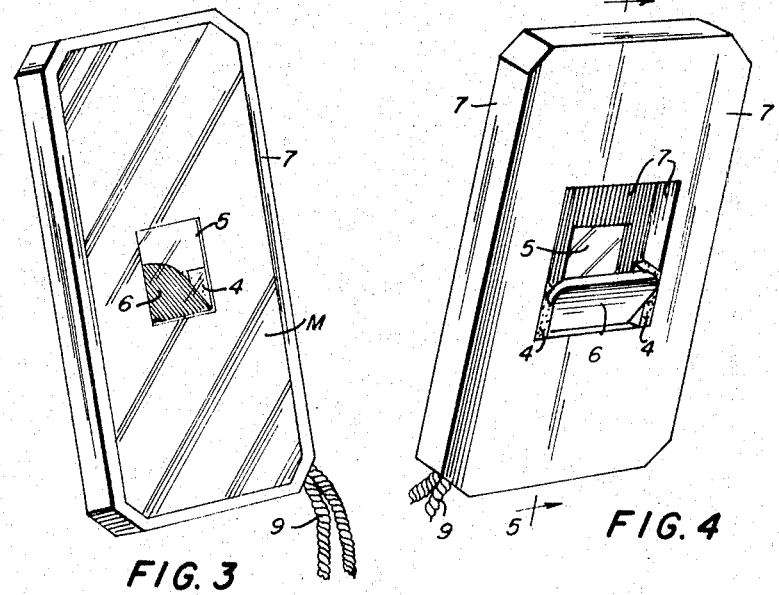

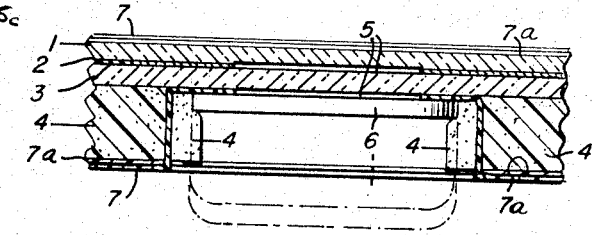
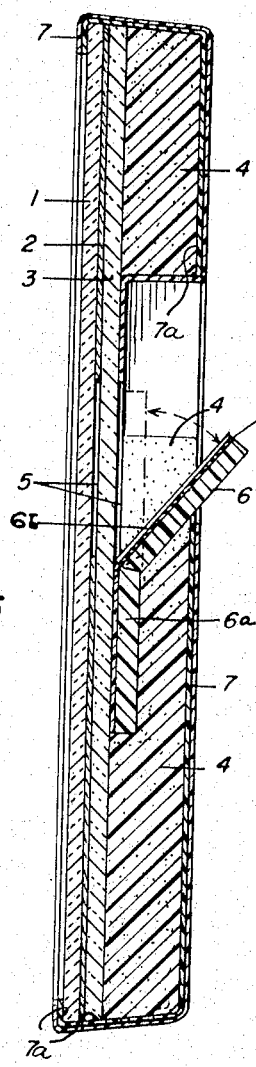
FIG. 5
FIG. 6
INVENTOR
MALCOLM G. MURRAY, JR.
BY Stone + Mack,
ATTORNEYS

This invention relates to an improved pocket-sized air-sea rescue solar signal mirror.

For many years devices embodying mirrors have been used to signal both by military and civilian sailors, soldiers, and campers. On clear and sunny days the reflection from one of them can often be seen for twenty miles or more. In World War II, many downed pilots were rescued as a result of signalling with such mirrors. They are still standard equipment in most military aviation survival kits, and in ships, rafts and life boats. They are about the best, cheapest, and the most foolproof of any emergency signalling device.

Despite all of the foregoing advantageous features, they nevertheless have certain deficiencies. Some include glass, which breaks easily when dropped on a hard surface, or when involved in an airplane ditching or parachute jump. Others include metal which does not break, but it does tarnish rapidly, particularly in marine environments. All such types will sink if dropped into water which renders them easily lost from life-boats or rafts.

In contrast to the foregoing types of construction, the article of this improvement is easy to use; is almost impossible to break unintentionally because it contains no glass; and has no exposed metal to corrode. Additionally, it is so light in weight that it floats readily on water and is non-absorbent as regards water. Further it has a night-reflective back which most military models omit.

The improved device of this invention is rectangular and is approximately 3 inches across and 5 inches in length and ½ inch thick.

A frame material is formed of a flexible closed-cell foam material such as polyethylene foam which provides substantially the major thickness and general outline of the device. Such material does not break and it serves well when held in the hand and as flotation insurance. The article is integrally self buoyant.

In addition to the foregoing general features, the following advantages characterize this improvement in the development of signal mirrors.

An object of the invention is to provide a signal mirror containing neither glass nor an exposed metal and which is thus highly resistant to breakage and corrosion and requires no protective case or packaging.

An additional object is to use a cold laminated transparent plastic to enclose a mirror surface and in which the method of cold lamination uses contact cement at ambient temperature, thus avoiding warping which often accompanies hot lamination of such plastic.

Still a further object of the invention is to provide a reflex aiming device employing Scotchlite as reflective media. Whereas previous reflex mirrors have used glass reflectors and some "blister type" signal mirrors have used Scotchlite, all such are believed to be relatively inferior and are more difficult to use than the reflex types. Likewise some Scotchlite material may deteriorate after many years, and with the "blister type" it cannot be replaced. However, in this present improvement anyone can apply a fresh piece of Scotchlite in a few seconds.

A still further feature of advantage inherent to this improved signal mirror is that both back and side surfaces employ Scotchlite as a night reflective medium. In this present improvement nothing breakable is used.

A still further advantage which characterizes this improvement is in the use of flexible closed-cell foam material, such as polyethylene foam, for breakage protection, for convenience in holding the aiming device in open or closed position as desired, and flotation, all as an integral part of the device. The resultant product is believed to be the first signal mirror integrally self-buoyant.

A still further feature of the device of this improvement is the use of daylight-fluorescent orange Scotchcal as an optional re-usable protective front cover which can be stuck onto any convenient surface such as a boat seat, a paddle, a helmet, and can be used generally as a short-range daylight signal. This use of Scotchcal is especially important on days when the sun is not shining.

An additional feature of advantage characterizing the article of this invention is that it is probably the lightest weight signal mirror of its size ever made, less than three ounces total weight for the size specified hereinbefore.

A still further advantage of this improved signalling device is that the mirror is highly break resistant and has a reflecting quality equal to a good plate glass mirror, and is non-spark producing if dropped on a metal surface. This feature is of some importance from a safety standpoint when used as an aid to oil inspectors working on tanker ships. Such inspectors do not like to use glass mirrors because they break easily; and so metal mirrors are normally used but the non-sparking stainless steel mirror models have poor reflecting quality, and the chrome plated ones sometimes will produce a spark if dropped. Both types will tarnish and neither one is as satisfactory in reflecting quality as glass or as the plastic mirror of this present invention.

The foregoing and additional features of advantage which characterize the article of this invention are described and claimed in the following specification and claims when considered in connection with the accompanying drawings in which:

FIG. 1 is a plan view of the signalling device showing the reflecting surface facing upwardly and with the sighting opening at the center and the lower portion being covered with fluorescent orange Scotchcal;

FIG. 2 is a rear view of the device showing a retro-directive reflector obscuring the sighting opening;

FIG. 3 is a view showing the front of the device tilted as one held in the hand of the user and with the retro-directive reflector in an open position;

FIG. 4 is a view of the rear with the retro-directive reflector in the open position;

FIG. 5 is a sectional view taken on the line 5—5 of FIG. 4, with the retro-directive reflector in the open position; and FIG. 6 is a fragmentary sectional view on the line 6—6 of FIG. 2 showing that portion of the device having the sighting opening and with the retro-directive reflector in the closed position.

Referring in detail to the several figures of the drawings, M represents the front of the device having a reflecting surface. The details of construction of the signal mirror device include a first transparent plastic sheet 1. On the rear surface of said sheet is deposited a layer 2 of aluminum to form a mirror surface contiguous with said rear surface. A second sheet of transparent plastic 3 is coextensive with said first plastic sheet and is laminated to said first plastic sheet with said aluminum deposit therebetween. In brief, the deposit of aluminum 2 is sandwiched between and protected by the transparencies 1 and 3.

The frame-like backing member of the article is indicated at 4, which covers the transparency 3 except at a central portion where there is a sighting opening 5. A closure adapted to cover the sighting opening 5 is indicated at 6 and the edges of the closure 6 are adapted to be gripped by the material of the frame-like backing member 4. Thus the closure or aiming flap 6 is frictionally held in any predetermined position. The frame 4 and the transparencies 1 and 3 are bound at the edges by Scotchlite material which serves as a facing material and overlaps the transparency 1 at its immediate marginal portions. On the rear face the Scotchlite facing material 7 is continued completely across the rear face except for the sighting opening 5 and the exposed portion of the frame material 4. Preferably the material 7 is of green Scotchlite. Immediately beneath the green Scotchlite is a reinforcing material 7a consisting of 3M Scotch No. 33 black vinyl plastic electricians' tape, or equal. This material serves to prevent accidental puncturing of those portions of the Scotchlite which cover the flexible foam frame 4. 6a is a fixed hinge portion of the said aiming flap. 6a is hinged to 6 with a flexible plastic material 6c. 6a is mounted at the rear face of the plastic sheet 3 adjacent the edge of the sighting opening 5. 6a is hinged to 6 with a flexible plastic material 6c which extends over the forward face of the fixed hinge portion 6a and extends over the aiming flap 6. 6 and 6a should be of relatively stiff plastic and the forward portion of the aiming flap 6 is coated with a layer of Scotchlite 6b, preferably of red color. The rear face of that aiming flap 6 may be coated with a Scotchlite material also, of green color such as used on the covering 7 over the edges and rear of the main body of the article.

A lanyard 9 is shown in FIGS. 1-4 leading from a corner of the frame of the device. A bridge 10 formed of rigid plastic material is attached over the lanyard near one corner to the back of the transparency 3 using Eastman 910 or other suitable adhesive. This so-called bridge 10 is actually in the nature of a block of rigid plastic. The knotted ends of the lanyard 9 are thus secured in a concealed manner and without the necessity of drilling a hole through the main plastic lamination. In this way the ends of the lanyard project through the bridge or block 10 and are folded over or knotted on the side of the element 10 farthest from the corner of the device.

Reviewing the exceptional features of the device of this invention, it may be noted that the re-usable removable front cover 8 having a pressure-sensitive adhesive backing, such as 3M "Scotchcal" which serves a purpose for protection from dirt and scratches, will also serve as a short range daylight signal, independent from the mirror.

In FIGURES 5 and 6, it will be observed that the reinforcing backing 7a for the Scotchlite material 7 covers the foam 4. This reinforcing backing 7a is not dependent on the operation of the mirror but does contribute to its durability by preventing users from accidentally puncturing the Scotchlite material 7 with their fingernails or other sharp objects.

In FIGURES 1-5 inclusive, Scotchlite material 7 is used to cover the corners and back recess of the foam material 4. In some productions the Scotchlite covering may advantageously be substituted by a green plastic tape "Scotch No. 190-A," but this substitution does not change the appearance illustrated in FIGURES 1 to 5 inclusive.

In FIGURES 2 and 4, there is no showing of overhang by foam 4 at the back of the aiming device. However, this overhang is shown in FIGURE 5 and may help explain how the device operates.

A distinct advantage is to be found in the use of a mirror surface formed by vacuum metallizing with aluminum on the back surface of the front sheet of transparent plastic 1 and without the use of any lacquer. The corollary of this coated surface is to protect it by laminating to its other surface a similar sheet of transparent plastic. This laminated structure is highly satisfactory. Plexiglas G clear transparent acrylic plastic will give satisfactory results for both the front and back sheets 1 and 3 of the drawing. Another product which is more heat and scratch resistant can be provided by the use of CR-39 allyl diglycol carbonate clear transparent plastic. Either or both of the foregoing transparent plastics may be used, or a combination of the two.

Adhesive sealant is placed between the two layers of plastic, permitting a lamination to be made without application to heat. One suitable material for this purpose is Duratite Contact Cement. This method of lamination does not require an intermediate plastic sheet, as found in laminated safety glass. In addition to utilizing an easy method, requiring no heating equipment or presses, this plastic lamination technique avoids warping often found in hot plastic laminations. It is also highly resistant to accidental breakage. If it does break, the break is usually in the form of a single crack, which offers little impairment to continued use of the mirror. The adhesive-sealant on both sides of this crack will continue to protect the mirror surface. The foam back is also attached with the same type of adhesive, and this prevents the cracked plastic pieces from separating. In effect, it performs the same function here as the intermediate membrane in laminated safety glass, but the overall effect is usually better, due to the non-shattering properties of the transparent plastic.

An edge sealant may be used for additional protection, although this should not be necessary in most cases. One suitable material for this purpose is "Duro Plastic Rubber," a liquid neoprene formulation which dries by solvent evaporation.

The aiming device is shown in section in FIGURE 5 in the open position (and in dashed lines in the closed position). The reason for having two positions is to permit closing the device for ease of carrying in one's pocket, without snagging, and opening it when ready to use it. Also, the aiming flap, when in the closed position, protects the back surface of the sighting aperture against dirt and abrasion. The flexible foam back recess is arranged so as to exert a squeezing force on the aiming device flap, holding it in open or closed position as desired, by a combination of compressive force and friction. The aiming device can be made of any suitable material. One-eighth inch thick Plexiglas G is suitable, but it need not be transparent. Polypropylene might also be used, and this might permit one-piece construction with an integral hinge.

The stationary half of the aiming device is mounted on the back surface of the back transparent sheet 3 using a suitable adhesive such as Duratite Contact Cement or Eastman 910 adhesive.

The two halves of the aiming device 6 and 6a are joined together on their under sides with a hinge equal to 3M Scotch No. 33 black vinyl plastic electricians' tape, pressure-sensitive adhesive backed as shown in FIGURE 5 unless made in a single piece with an integral hinge.

A red reflective material equivalent to 3M Scotchlite sheeting, pressure-sensitive adhesive backed, is stuck to the underside of the moving half of the aiming device 6 or to the hinge material if this be used, as shown in the section of FIGURE 5.

In connection with the foam backing and generally for the shape of the article, it may be a closed-cell flexible foam such as polyethylene foam. This material helps protect against damage to the mirror by acting as a cohesive agent and holding the mirror together in case it becomes cracked although this cracking is highly unlikely. It also acts as a partial shock absorber, thus reducing the chance of damage. The foam backing serves as an integral part of the aiming system, as explained in a previous paragraph, and serves to hold the aiming device in either open or closed position as desired. The foam material being a low density closed cell material provides sufficient displacement buoyancy to cause the mirror and other structural details to float. This necessarily serves as a definite aid in preventing loss of the device if dropped overboard.

It will be understood that variations in dimensions, materials and colors may be adopted as desired and that those specified hereinbefore are typical only. Such changes may be altered as desired for different size, materials, or appearance of the mirror. Thus a Scotchlite of red may be substituted for Scotchlite of green and the size of the device may be varied according to the preferred shape and demand. Likewise polyethylene foam and CR-39 plastic may be substituted by other materials which can be used to make mirrors of basically the same design as in this present disclosure, and all of the foregoing changes expressed hereinbefore may be made without departing from the scope of this invention.

As a guide to the user of a device such as that previously described and claimed, it is recommended that the following instructions be printed on the back of the device:

(1) Face toward the sun.
(2) Lift the back flap.
(3) Hold one hand outstretched and reflect the sun onto it, holding reflector by fingertips of other hand.
(4) Look with one eye through clear spot beneath back flap, at reflection on the hand. A red spot should appear.
(5) Lower outstretched hand, and move reflector until red spot is on boat or plane. A bright reflection will now be visible from as far away as a boat or plane can be seen.
(6) If red spot disappears, tilt reflector upward toward horizontal, or rotate until flap faces opposite from original position. With the sun high, it is easy to signal in any direction. With the sun low, signaling away from the sun is difficult. Practice helps!
(7) At night, the green surface will be visible in the beam of a searchlight.
(8) Warning! This is not a toy! Keep it away from children. Do not reflect at motorists—it could blind them momentarily and cause an accident.

I claim:

1. A signal mirror device comprising a first transparent plastic sheet, a deposit of aluminum on and covering the face of said sheet and over the entire face of said first sheet except for a clear portion constituting a sighting opening, a second transparent plastic sheet of substantially the same size as said first sheet and in laminated arrangement with said first sheet with the deposit of aluminum being sealed between said first and said second sheets, a frame-like backing member for said device disposed over and adhesively secured to the surface of said second plastic sheet on that side thereof distant from said deposit of aluminum and substantially of the same area as said second plastic sheet except for said sighting opening and said backing member being of substantially greater thickness than said two transparent sheets, said backing member being formed of flexible closed cell plastic foam, whereby the backing member lends strength and rigidity to the plastic sheets and buoyancy for floation on water.

2. A signal mirror device comprising a first transparent plastic sheet, a deposit of aluminum on and covering the face of said sheet and over the entire face of said first sheet except for a clear portion constituting a sighting opening, a second transparent plastic sheet of substantially the same size as said first sheet and in laminated arrangement with said first sheet with the deposit of aluminum being sealed between said first and said second sheets, a frame-like backing member for said device disposed over and adhesively secured to the surface of said second plastic sheet on that side thereof distant from said deposit of aluminum and substantially of the same area as said second plastic sheet except for said sighting opening and said backing member being of substantially greater thickness than said two transparent sheets, said backing member being formed of flexible closed cell plastic foam, whereby the backing member lends strength and rigidity to the plastic sheets and buoyancy for use in water, said foam additionally acting as a cohesive membrane externally adhering to the rear side of said second transparent plastic sheet whereby said sheet, if cracked or broken, is held together by said foam.

3. A signal mirror device comprising a first transparent plastic sheet, a deposit of aluminum on and covering the rear face of said first sheet and over the entire face of said first sheet except for a clear portion constituting a sighting opening, a second transparent plastic sheet of substantially the same size as said first sheet and in laminated arrangement with said first sheet with the deposit of aluminum being sealed between said first and said second sheets, a frame-like backing member for said device disposed over and adhesively secured to the surface of said second plastic sheet on that side thereof distant from said deposit of aluminum and substantially of the same area as said second plastic sheet except for said sighting opening and said backing member being of substantially greater thickness than said two transparent sheets, said backing member being formed of flexible closed cell plastic foam, whereby the backing member lends strength and rigidity to the plastic sheets and buoyancy for use in water, said foam being sufficiently buoyant in water to cause the complete device to float, the foregoing structure being covered by puncture-resistant plastic sheeting glued to the external surface of the foam, such sheeting being then covered externally by pressure-sensitive adhesive-backed colored reflective sheeting, with the puncture-resistant plastic sheeting acting as a base for and reinforcement to the colored reflective sheeting, thereby imparting resistance to damage to said reflective sheeting which could otherwise result from penetrating such reflective sheeting by any sharp object, both the reflective and reinforcing sheeting and their adhesives being highly resistant to damage by water immersion.

4. A signal mirror device comprising a first transparent plastic sheet, a deposit of aluminum on and covering the rear face of said first sheet and over the entire face of said first sheet except for a clear portion constituting as sighting opening, a second transparent plastic sheet of substantially the same size as said first sheet and in laminated arrangement with said first sheet with the deposit of aluminum being sealed between said first and said second sheets, a frame-like backing member for said device disposed over and adhesively secured to the surface of said second plastic sheet on that side thereof distant from said deposit of aluminum and substantially of the same area as said second plastic sheet except for said sighting opening and said backing member being of substantially greater thickness than said two transparent sheets, said backing member being formed of flexible closed cell plastic foam, whereby the backing member lends strength and rigidity to the plastic sheets and buoyancy for flotation on water, said sighting opening constituting part of an aiming device having as its other part a closure for said sighting opening, a support member attached to said second transparent sheet and adjacent said opening, a flexible sheet hinge member hingedly supporting said closure to said support member, a retrodirective reflective member attached to said closure proximate said second transparent sheet member, said closure being held in the desired open or closed position by the squeezing action of the plastic foam frame upon its two edges.

5. A signal mirror device comprising two transparent plastic sheets of substantially the same size and in laminated arrangement and having a sheet of deposited aluminum with a highly reflective surface sealed between said two transparent sheets and covering the area of said transparent sheets except for a sighting opening, and constituting a reflecting member, a frame-like backing member for said device disposed over and adhesively secured to the surface of that plastic sheet opposite said reflective surface and substantially of the same area as said plastic sheets except for said sighting opening and said frame-like backing member being of substantially greater thickness than said two transparent sheets, said frame-like backing member being formed of flexible closed cell plastic foam, whereby the backing member lends strength and rigidity to the plastic sheets and buoyancy for flotation on water, the two plastic sheets constituting the front of the said device and the frame-like backing member the rear of said device.

6. A signal mirror device comprising a first transparent plastic sheet, a deposit of aluminum on and covering the face of said sheet and over the entire face of said first sheet except for a clear portion constituting a sighting opening, a second transparent plastic sheet of substantially the same size as said first sheet and in laminated arrangement with said first sheet with the deposit of aluminum being sealed between said first and said second sheets, a contact cement requiring no heat between said first and said second plastic sheets, a frame-like backing member for said device disposed over and adhesively secured to the surface of said second plastic sheet on that side thereof distant from said deposit of aluminum and substantially of the same area as said second plastic sheet except for said sighting opening and said backing member being of substantially greater thickness than said two transparent sheets, said backing member being formed of flexible closed cell plastic foam, whereby the backing member lends strength and rigidity to the plastic sheets and buoyancy for flotation on water.

7. A signal mirror device comprising a first transparent plastic sheet, a deposit of aluminum on and covering the face of said sheet and over the entire face of said first sheet except for a clear portion constituting a sighting opening, a second transparent plastic sheet of substantially the same size as said first sheet and in laminated arrangement with said first sheet with the deposit of aluminum being sealed between said first and said second sheets, the edge of the laminated structure being hermetically coated with an ambient-temperature-setting neoprene rubber sealant, a frame-like backing member for said device disposed over and adhesively secured to the surface of said second plastic sheet on that side thereof distant from said deposit of aluminum and substantially of the same area as said second plastic sheet except for said sighting opening and said backing member being of substantially greater thickness than said two transparent sheets, said backing member being formed of flexible closed cell plastic foam, whereby the backing member lends strength and rigidity to the plastic sheets and buoyancy for flotation on water.

References Cited
UNITED STATES PATENTS

| | | | |
|---|---|---|---|
| 2,395,605 | 2/1946 | Young | 116—20 |
| 2,467,165 | 4/1949 | Stimson | 116—20 |
| 2,504,982 | 4/1950 | Hunter | 116—20 |
| 2,589,618 | 3/1952 | Learned | 116—20 |
| 2,698,594 | 1/1955 | Morgan | 116—20 |
| 2,698,596 | 1/1955 | Morgan | 116—20 |
| 2,832,968 | 5/1958 | Knudsen | 240—10.66 |
| 2,898,878 | 8/1959 | Reinholdt | 116—28 |
| 3,164,124 | 1/1965 | Ehrsom | 116—20 |

LOUIS J. CAPOZI, *Primary Examiner.*